(12) United States Patent
Leizerovich et al.

(10) Patent No.: US 7,136,680 B2
(45) Date of Patent: Nov. 14, 2006

(54) MOTION DETECTING WIRELESS RECEIVER AND SIGNAL MONITORING METHOD THEREFOR

(75) Inventors: Gustavo D. Leizerovich, Aventura, FL (US); Wayne Wiggins Ballantyne, Coconut Creek, FL (US); Jaime Borras, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/403,231

(22) Filed: Mar. 31, 2003

(65) Prior Publication Data
US 2004/0192347 A1 Sep. 30, 2004

(51) Int. Cl.
*H04M 1/00* (2006.01)

(52) U.S. Cl. ............... 455/574; 455/456.1; 455/456.2; 455/456.3; 455/456.4; 455/434; 455/522; 455/343; 455/515

(58) Field of Classification Search ............ 455/456.1, 455/529, 572, 343, 524, 434, 456.3, 515, 455/456.14; 702/188; 320/311
See application file for complete search history.

(56) References Cited

U.S. PATENT DOCUMENTS

| 6,067,460 | A | * | 5/2000 | Alanara et al. | ............. 455/574 |
| 6,363,267 | B1 | * | 3/2002 | Lindskog et al. | ........... 455/574 |
| 6,671,660 | B1 | * | 12/2003 | Freed | ......................... 702/188 |
| 2002/0147024 | A1 | * | 10/2002 | Wan | .......................... 455/515 |
| 2002/0177476 | A1 | * | 11/2002 | Chou | ......................... 455/574 |

* cited by examiner

*Primary Examiner*—Joseph Feild
*Assistant Examiner*—David Q. Nguyen

(57) ABSTRACT

A portable wireless transceiver (104) includes a receiver (206) for monitoring transmissions from neighboring transceivers (106A and 106B) to select a transceiver to use for communications. The portable wireless transceiver (104) further has a motion detector (204) for determining whether or not the portable wireless transceiver (104) is moving. If the portable wireless transceiver (104) is determined to not be moving, a processor (202) alters a schedule for monitoring of neighboring transceivers (106A and 106B) so that the monitoring is performed less frequently, thereby reducing power consumption by the portable wireless transceiver (104).

17 Claims, 2 Drawing Sheets

MOTION DETECTING WIRELESS RECEIVER AND SIGNAL MONITORING METHOD THEREFOR

FIELD OF THE INVENTION

The present invention generally relates to the field of wireless receivers, and more particularly relates to mobile wireless receivers that monitor wireless transmissions.

BACKGROUND OF THE INVENTION

Radio and wireless protocols that allow a single wireless communications transceiver to seamlessly transfer communications between different base stations have greatly expanded the usefulness of mobile communications. Applications such as cellular phone systems allow a mobile radio transceiver to seamlessly transfer a communications session from one base station to another without interruption of the communications session. Such a transfer is usually performed as a mobile transceiver moves from one cell to another.

The multiple base stations of these systems are generally assigned a transmitting frequency on which to transmit an identifying transmission that may also contain other data. The RF frequencies used for these transmissions are generally restricted to a small set that can be efficiently monitored by a mobile receiver that is part of a mobile transceiver. A mobile receiver is able to monitor these base station transmissions and identify transmissions from base stations that are sufficiently close to the mobile receiver to allow effective reception. The base stations that are close enough to a mobile receiver so as to allow effective reception communications are referred to as "neighbor stations." In cellular telephone systems, these transceivers are referred to as "neighbor cells." Mobile receivers and transceivers periodically attempt to receive transmissions from neighbor stations and then measure the received signal quality of each received transmission. The mobile receiver is then able to determine, by identifying the received signal with the highest signal quality, the neighboring base station that is the best candidate for radio communications. Signal quality measurements include determining a signal to noise, carrier to interference (C/I) ratio, and/or Bit Error Rate (BER) for the received signal. The neighboring base station that transmits the signal that is received with the highest signal quality is presumed to also be the best base station with which the mobile transceiver can engage in two-way wireless communications. Once this highest quality base station is determined, it becomes the "serving cell" and the mobile receiver begins to decode control channel information from this cell according to a certain schedule. The other surrounding base stations are then categorized as "neighbor cells" whose "signal quality", or C/I, is periodically monitored according to a separate schedule. This allows the mobile receiver to switch over, or "hand off" to the neighbor cell with the strongest C/I when the serving cell C/I drops below a certain threshold relative to the neighbor cells.

The area near a cellular telephone base station transceiver in which mobile transceivers can effectively communicate with that base station is often referred to as a cell. As the mobile transceiver moves among the cells associated with different base stations, the base station with the highest quality signal is subject to change. Various radio mobility management algorithms are used in different mobile radio applications to monitor the neighboring stations in order to determine with which base station to communicate. Some of these protocols generally perform a cell monitoring process that monitors transmissions from neighboring cells, determines the transmission that is received with the highest signal quality, and selects the cell that corresponds to the transmission that is received with the highest quality for communications. This cell monitoring process is performed periodically according to the requirements of the particular protocol.

This periodic monitoring of transmissions from neighbor stations unfortunately consumes transceiver resources and power. This is a particularly significant consumption of resources and power when a mobile transceiver is operated in a standby mode that can last for hours or days while the mobile transceiver is not engaged in an active communications session. The conventional mobile transceiver continues to monitor neighbor stations at the same periodic monitoring rate to determine the best station with which to communicate, whether the mobile transceiver is stationary or moving.

Therefore a need exists to overcome the problems with the prior art as discussed above.

SUMMARY OF THE INVENTION

According to a preferred embodiment of the present invention, a wireless receiver comprises a receiver for monitoring for a transmission from a station at a series of time points. The series of time points is defined by a first time schedule. The wireless receiver further has a motion detector for determining if the receiver is not moving. The wireless receiver further has a transmission monitor scheduler that is communicatively coupled to the motion detector and the receiver and that adjusts the series of time points according to a second time schedule when it is determined that the receiver is not moving.

According to a preferred embodiment of the present invention, a method comprises monitoring at a receiver at a series of time points that are defined by a first time schedule for a transmission from a station. The method then determines if the receiver is not moving. If the receiver is determined to not be moving, the method adjusts the series of time points according to a second time schedule.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
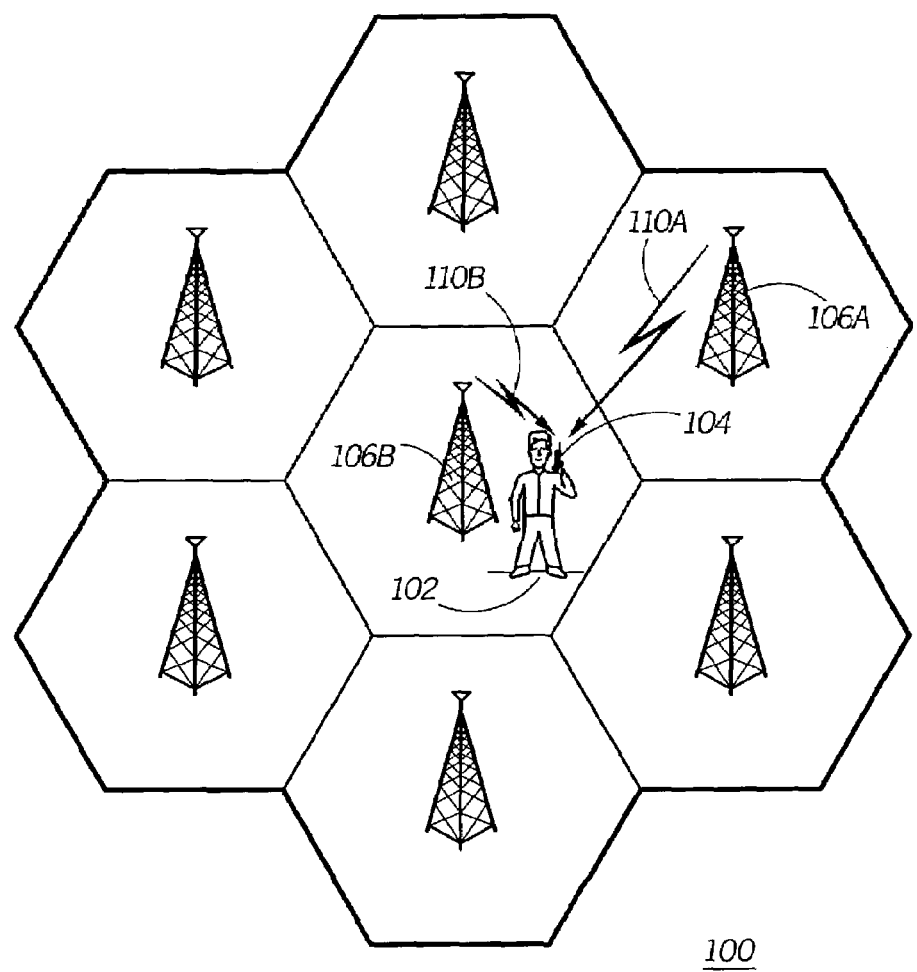
FIG. 1 is an illustration of the arrangement of communications facilities in a system according to a preferred embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A preferred embodiment of the present invention takes advantage of the fact that for a mobile radio transceiver that is not moving the base station with the highest received signal quality is unlikely to change, and therefore monitoring of other neighbor stations, for the most part, is probably unnecessary. Continuous monitoring of neighbor stations at the same rate as when the mobile radio transceiver is moving unnecessarily consumes transceiver resources and power. This is particularly relevant when a mobile transceiver is operated in a standby mode, that can last for hours or days, when the mobile transceiver is not engaged in an active communications session and is not moving. Conventional mobile transceivers, which lack means to detect the mobile transceiver's acceleration or velocity, unfortunately, will continue to monitor neighbor stations to determine the best station with which to communicate, even when the conventional mobile transceiver is stationary and the best base station does not change. If the mobile transceiver had a mechanism to detect movement, it could potentially reduce the energy expended on neighbor cell monitoring. Unfortunately, most present generation mobile transceivers do not incorporate such a mechanism.

The present invention, according to a preferred embodiment, overcomes problems with the prior art by providing a radio receiver with a means of detecting motion of the radio receiver. The radio receiver, according to a preferred embodiment of the present invention, is part of a mobile radio transceiver that performs wireless communications with one of several neighboring, fixed location radio transceiver base stations. However, it should be obvious to those of ordinary skill in the art in view of the present discussion that any type of mobile wireless receiver device that receives communications from a plurality of transmitting stations will benefit from the advantages of the present invention.

This radio receiver, that is part of a mobile radio transceiver according to the present example, monitors transmissions from the neighbor stations at scheduled time points in order to determine which of the radio transceiver base stations will provide the most effective wireless communications. The radio receiver monitors for these transmissions at a series of time points that are defined by a schedule. This radio receiver detects physical motion of the radio receiver and if no motion is detected, the interval between the monitoring of the multiple nearby transceivers is increased to reflect the reduced likelihood that a different radio transmitter would provide more effective communications.

A physical arrangement of an exemplary operational environment 100 for a radio transceiver incorporating an embodiment of the present invention is illustrated in FIG. 1. A user 102 has a portable radio transceiver 104 that is a cellular telephone transceiver that has a receiver, a transmitter and associated control circuitry. The radio transceiver 104 is able to communicate with any one of multiple neighboring base station transceivers within cellular base stations that are part of a cellular telephone land mobile network and that are within wireless communication range of the radio transceiver 104. The exemplary operational environment 100 shows two base station transceivers, a far base station transceiver 106A and a near base station transceiver 106B. Signals are wirelessly communicated between the portable transceiver 104 and the far base transceiver 106A over long wireless link 110a. Signals are similarly communicated between the portable transceiver 104 and the near base transceiver 106B over short wireless link 110B. In actual operation of the exemplary embodiment, many neighboring base station transceivers are frequently located sufficiently close to the portable transceiver 104 to support effective communications. The base station transceivers in this exemplary embodiment are shown as fixed for ease of understanding but this is not a requirement as is discussed below. The operation of the exemplary embodiment is more clearly understood by reference to the transmission function of the base transceivers and the receiving functions of the portable transceiver 104. It is understood that both the base station transceivers and the portable transceiver 104 in this exemplary embodiment include transmitting and receiving functions, although they are not required for the operation of these embodiments.

In the configuration of the exemplary operational environment 100, the more effective wireless communications between the portable transceiver 104 and a base station uses the short wireless link 110B to communicate with the near base transceiver 106B. The portable transceiver 104 therefore selects to communicate with the near base transceiver 106B by the techniques of the conventional protocol used by the wireless system of the exemplary embodiment. The more effective wireless communications in this example is due to the reduced transmission losses associated with the short wireless link 110B as compared to the long wireless link 106A. In practice, the shortest link may not give the best C/I at the mobile receiver, due to fading and large buildings or other structures in the line of sight between the mobile transceiver and base station. The "short wireless link" 110B is used in this description for simplicity of explanation and understanding.

The portable transceiver 104 of the exemplary embodiment determines the best base transceiver to use for communications by noting that the received wireless signal that corresponds to the signal transmitted by the near base transceiver 106B has higher quality than the received wireless signal that corresponds to the signal transmitted by the far base transceiver 106A. The portable transceiver 104 continues to monitor transmissions from neighboring base station transceivers, such as from the near base transceiver 106B and far base transceiver 106A, to determine which received signal has the highest quality and therefore which base transceiver to select for the most effective two-way communications.

Conventional mobile transceivers monitor neighboring base station transceiver transmissions according to a schedule. Some mobile transceivers monitor neighboring base station transceiver transmissions with different schedules depending upon the signal quality estimate (SQE) of the serving cell's received transmission. As the SQE of the received transmission improves, the time between monitoring of neighboring base stations is increased. Mobile transceivers typically monitor the neighboring base stations between several times per second and once every several seconds, depending on the requirements and design of the mobile transceiver, the assumed worst case user velocity, and the base station geometry.

If the portable transceiver 104 is not moving, the relationship between the portable transceiver 104 and the neighboring base station transceivers does not change and therefore the portable transceiver continues to select, for example, the near base transceiver 106B for wireless communications. In the case of a lack of movement by the portable transceiver 104, the frequency with which the portable transceiver 104 monitors the transmissions from the nearby base transceivers can be reduced since it is unlikely that the base transceiver that provides the best wireless communications will change.

Figure 2:
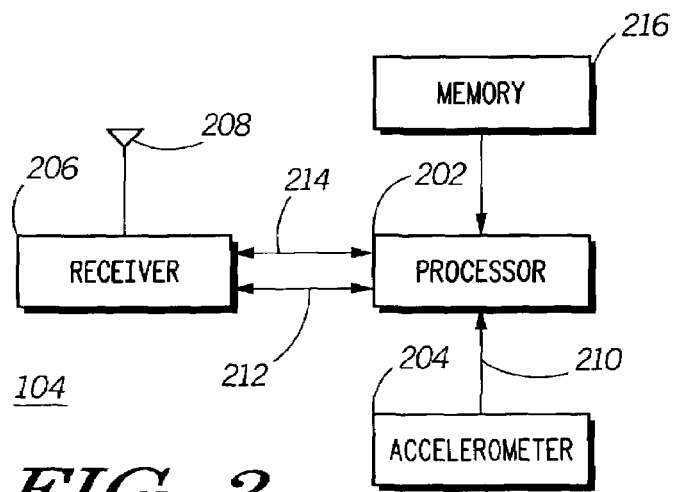
FIG. 2 is a block diagram of a portion of a radio according to a preferred embodiment of the present invention.

A block diagram of the relevant portions of a portable transceiver 104 that incorporates an embodiment of the present invention is illustrated in FIG. 2. The portable transceiver 104 contains other components that are not relevant to the operation of this embodiment of the present invention, and therefore will not be discussed in detail herein. The portable transceiver 104 includes a transmitter and an associated antenna assembly and structure for transmitting signals to the base station transceivers 106A and 106B, in a manner that is obvious to those of ordinary skill in the art in view of the present discussion. The transmitted communications from the portable transceiver 104 to the base station transceivers 106A and 106B are effected using known communication protocols and standard signaling in a manner well known in the art. The portable transceiver 104 also includes a receiver 206 coupled to an antenna 208. The receiver 206 receives, via the antenna 208, transmissions from the multiple base station transceivers, such as the near base station transceiver 106B and far base station transceiver 106A. The portable transceiver 104 includes a processor 202 that performs processing associated with this embodiment of the present invention. The processor 202 has an associated memory 216 that includes volatile and non-volatile memory elements to store information used by the processor 202. The receiver 206 is communicatively coupled to the processor 202. The receiver 206 of this exemplary embodiment accepts commands from the processor 202 to tune the receiver 206 to different receive frequencies. Note also that the antenna 208, according to alternative embodiments, may be shared between the receiver 206 and a transmitter (not shown) by using a transmit/receive switch (not shown under control of the processor 202 such that the antenna 208 is coupled to the receiver 206 while the transceiver 104 is in a receive mode, and the antenna 208 is coupled to a transmitter (not shown) while the transceiver 104 is in a transmit mode.

The receiver 206 couples received signals to the processor 202, which processes these signals into data signals to produce measured signal quality data for received transmissions. The processor 202 of the exemplary embodiment includes a signal processing component that processes signals received from the receiver 206 in order to monitor transmissions and determine measured received signal quality. The receiver 206 of the exemplary embodiment communicates with processor 202 over a pair of serial data interfaces: a signal parameter serial interface 212 and a control serial interface 214. The signal parameter serial data interface 212 of the exemplary embodiment conforms to a synchronous serial interface (such as the Motorola SSI format in the exemplary embodiment) and sends data associated with received in-phase and quadrature (I/Q) signals from the receiver 206 to the processor 202. The other serial interface, the control serial interface 214, is used, for example, for sending tuning commands from the processor 202 to the receiver 206. In alternative embodiments, the command serial interface is also used to send measured signal quality information from the receiver 206 to the processor 202. The exemplary embodiment uses the Motorola Serial Peripheral Interface (SPI) for the control serial interface 214. The preferred arrangement, however, is for the processor 202 to determine signal quality from the I/Q data received via the signal parameter interface 212.

The portable transceiver 104 of this exemplary embodiment includes a motion detector in the form of an accelerometer 204. The accelerometer 204 used in this exemplary embodiment is a dual-axis accelerometer; model number ADXL202E, produced by Analog Devices of Norwood, Mass., USA. The accelerometer 204 of the exemplary embodiment produces measured acceleration data in the form of a variable duty cycle pulse, where the duty cycle of a pulsed output is proportional to the measured acceleration. This pulsed output of the accelerometer 204 is communicated to processor 202 over accelerometer interface 210 and circuits within the processor 202 of this exemplary embodiment convert the pulse duty cycle into a digital format used by the processor 202.

The output of the accelerometer 204 is monitored to determine if the portable transceiver 104 is moving. Embodiments of the present invention time average the movement observations, i.e., the acceleration observations, that are produced by the accelerometer 204. This time average is then compared to a pre-determined threshold value to reduce the probability of a false detection of motion. If the value of the time averaged movement observations is below the pre-determined threshold value, a determination is made that the receiver is not moving. Embodiments of the present invention alternatively employ peak detection of acceleration data to determine motion under constant velocity conditions.

The accelerometer 204 of the exemplary embodiment is a two-axis accelerometer. This accelerometer monitors acceleration in two axes. Alternative embodiments of the exemplary embodiment utilize different accelerometers that are able to monitor acceleration, and therefore movement, in either one axis or in three axes. The likelihood of detecting movement of the mobile transceiver 104 is increased as more axes are monitored for movement. The accelerometer 204 of the exemplary embodiment is a solid-state device that is well suited for mobile applications. Alternative embodiments utilize an accelerometer 204 that incorporates one or more gyroscopes or other electrical and/or mechanical devices to measure acceleration or movement of the transceiver along one or multiple axes.

The exemplary embodiment of the present invention includes processing in the processor 202 for an observation processor that calculates a time average of the movement observations that are reported by the accelerometer 204 in order to reduce the probability of false alarms. Time averaging of movement observations can be used by various embodiments according to the expected noise and other inaccuracies that are produced by the accelerometer 204.

The inventors have observed that an accelerometer is useful for detecting movement even when the mobile transceiver 104 is moving with constant velocity. Movement of the mobile transceiver 104, and therefore the accelerometer 204, at a constant velocity is generally thought to result in zero acceleration of the mobile transceiver 104 and therefore no appreciable output of the accelerometer 204. The inventors have observed that, in practical environments, vibrations and other movements usually accompany constant velocity movement. These vibrations and other movements result in apparently random and non-zero acceleration being reported by the accelerometer 204 even when the mobile transceiver is moving at a constant velocity. This random and non-zero acceleration appears as an acceleration noise at the output of the accelerometer 204. The use of a multiple axis accelerometer increases the likelihood that such vibrations will be observed and reported and is therefore preferable.

Figure 3:
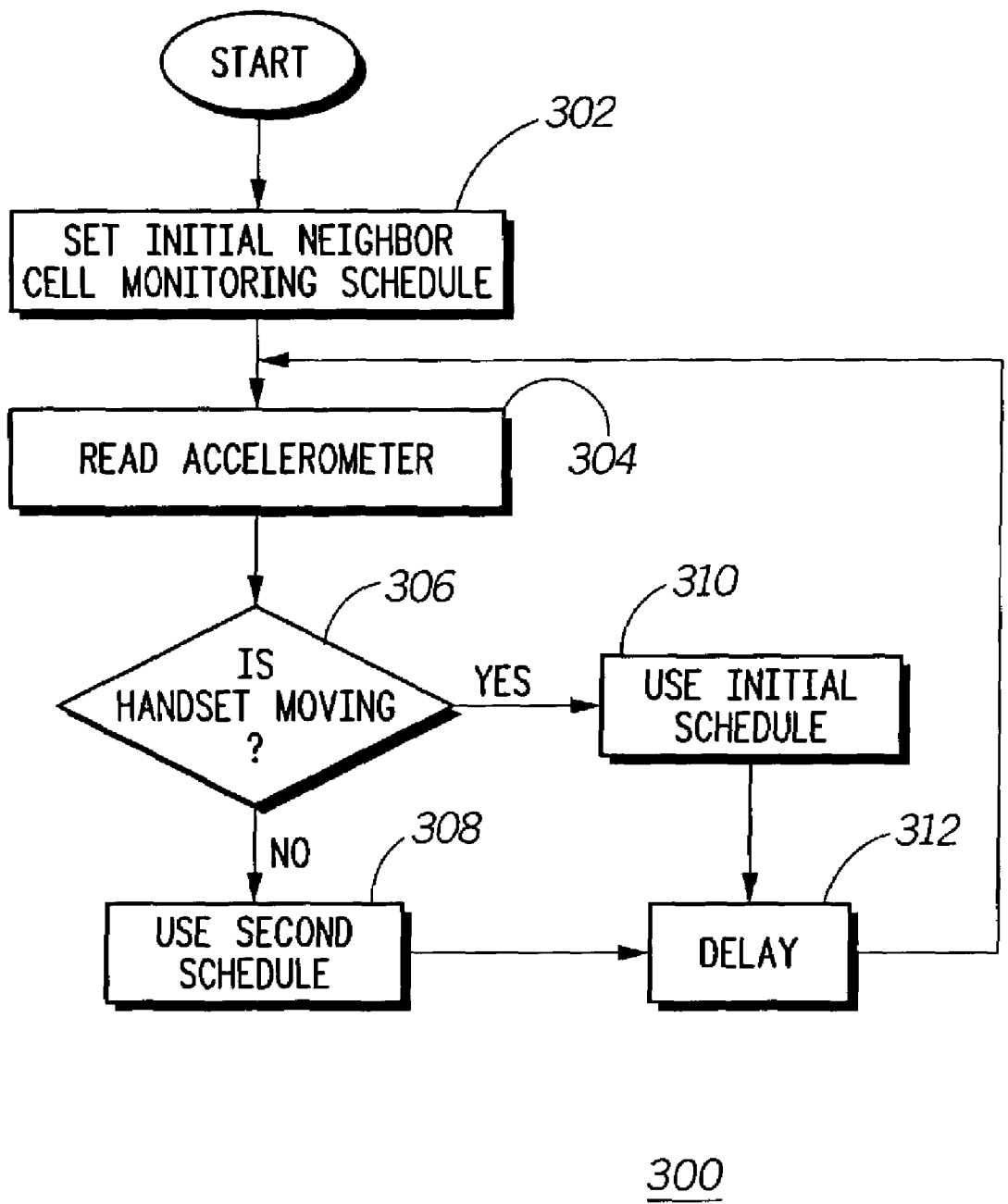
FIG. 3 is a processing flow diagram for a transmission monitor scheduler according to a preferred embodiment of the present invention.

A neighboring cell transmission monitor scheduler program processing flow diagram 300 as is utilized by an exemplary embodiment of the present invention is illustrated in FIG. 3. The processing begins by setting, at step 302, the neighbor cell monitoring schedule to an initial or first time schedule. The initial time schedule of the neighbor cell monitoring schedule is determined by the requirements of the overall communications system. A simple neighboring cell monitoring schedule, in which the neighboring cells are monitored at a series of time points that are each separated by a fixed time interval of 90 milliseconds, is used in this example for ease of understanding. It is clear that more complex neighboring cell monitoring schedules can be similarly developed and used in alternative embodiments. A more complex example includes a cell monitoring schedule that defines a 360 millisecond interval that has a series of four (4) monitoring time points that are each separated by 90 millisecond intervals and where the processing of the portable transceiver 104 then monitors neighboring cells at three of these four time points. The omitted time point can be randomly selected. Alteration of these neighboring cell monitoring schedules based upon received signal strength and/or other parameters is also possible.

Once an initial neighboring cell monitoring schedule is set, the processing continues by reading, at step 304, the output of the accelerometer 204. The accelerometer provides an indication of the acceleration of the mobile transceiver 104. The acceleration data is averaged in some embodiments to reduce false detection of motion. The averaged acceleration value is examined, at step 306, to determine if the mobile transceiver 104 is moving. If the mobile transceiver 104 is determined to be moving, the processing continues by setting, at step 310, the monitoring schedule to the initial schedule. If the monitoring schedule was already set to the initial schedule, no change results from this step. If the mobile transceiver 104 is determined to not be moving, the processing sets the neighboring cell monitor schedule to a second time schedule. The second time schedule used by the exemplary embodiments of the present invention results in a less frequent monitoring of the neighboring cells. In the exemplary embodiment, the second time schedule results in monitoring of neighboring cells at a series of time points that are separated by approximately four seconds, which is much longer than the 90 milliseconds of the first time schedule and results in a reduction in power consumption used to monitor the neighboring cells. After setting the neighboring cell monitoring schedule, the processing of the exemplary embodiment delays, at step 312, until the next reading of the accelerometer 204. The processing of the exemplary embodiment performs the neighboring cell transmission monitor scheduler program processing in conjunction with iterations of the neighboring cell monitoring processing. This results in execution of the neighboring cell transmission monitor scheduler processing steps at the same interval, i.e., at the same time points, as the neighboring cell monitor processing that is being scheduled. Alternative embodiments execute the neighboring cell transmission monitor scheduler program processing during alternate or less frequent iterations of the neighboring cell monitor processing. After this delay, the processing returns to reading, at step 304, the accelerometer 204 and the subsequent processing described above.

Alternative embodiments of the present invention determine if the mobile transceiver 104 is moving by different means. One embodiment incorporates a Global Positioning System (GPS) receiver into the mobile transceiver 104 and uses the velocity determination of that GPS receiver to determine movement of the mobile transceiver 104. Any other means that allows determination of movement of the mobile transceiver 104 is similarly effective.

Other embodiments of the present invention operate with mobile base station transceivers. These embodiments select a second time schedule for monitoring neighboring stations that sets the interval between monitoring time points that are sufficiently short so as to ensure that the closest neighboring base station transceiver is not out of communications range of the mobile transceiver before the neighboring cell monitoring function next executes. Embodiments of the present invention are similarly able to operate with wireless links that are communicated over satellites and other relay stations. Other embodiments of the present invention utilize different wireless communications techniques such as infrared and other optical links.

Embodiments of the present invention are incorporated into receive only mobile devices. One exemplary embodiment of the present invention incorporates an accelerometer into a GPS receiver. The GPS receiver of this embodiment processes GPS signals only at the scheduled time points in order to conserve power and to make processing resources available to other applications. This embodiment varies the schedule of GPS signal processing based upon measured movements of the GPS receiver as determined by observation and integration of the accelerometer output. In this embodiment, the processing of GPS signals is performed at the scheduled series of time points in a manner that is similar to the scheduled monitoring of neighboring cells in the above description.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising:
    monitoring, at a receiver, for at least one transmission from a plurality of stations, wherein the monitoring is performed at a series of time points defined by a first time schedule in order to determine one station in the plurality of stations with which to communicate;
    determining, independently of the monitoring, if the receiver is not moving; and
    continuing the monitoring by adjusting, in response to a determination that the receiver is not moving, the series of time points according to a second time schedule, wherein the series of time points defined by the second time schedule comprises time points that are separated by longer time intervals than the series of time points defined by the first time schedule.

2. The method according to claim 1, wherein the determining if the receiver is not moving comprises time averaging movement observations.

3. The method according to claim 1, wherein the receiver comprises a GPS receiver.

4. The method according to claim 1, wherein the receiver is a receiver portion of a cellular telephone transceiver, and wherein the plurality of stations comprises a cellular base station transceiver.

5. The method according to claim 1, wherein the determining if the receiver is not moving comprises determining movement with a global positioning receiver.

6. The method according to claim 1, wherein the determining if the receiver is not moving comprises monitoring an accelerometer.

7. The method according to claim 6, wherein the accelerometer comprises at least one of a one axis accelerometer, a two axis accelerometer, and a three axis accelerometer.

8. The method according to claim 6, wherein the determining comprises determining if acceleration noise output of the accelerometer is larger than a predetermined threshold.

9. A wireless receiver, comprising:
    a receiver for monitoring for a transmission from a plurality of stations at a series of time points, wherein the series of time points is defined by a first time schedule;
    a motion detector for determining, independently of the monitoring of the receiver, if the receiver is not moving; and
    a transmission monitor scheduler, communicatively coupled to the accelerometer and the receiver, for adjusting, in response to a determination that the receiver is not moving, the series of time points according to a second time schedule, wherein the series of time points defined by the second time schedule comprises time points that are separated by longer time intervals than the series of time points defined by the first time schedule.

10. The wireless receiver according to claim 9, wherein the motion detector comprises an observation processor that time averages movement observations.

11. The wireless receiver according to claim 9, wherein the receiver is a receiver portion of a cellular telephone transceiver, and wherein the plurality of stations comprises a cellular base station.

12. The wireless receiver according to claim 9, wherein the receiver comprises a GPS receiver.

13. The wireless receiver according to claim 9, wherein the motion detector comprises a global positioning receiver.

14. The wireless receiver according to claim 9, wherein the motion detector comprises an accelerometer.

15. The wireless receiver according to claim 14, wherein the accelerometer comprises at least one of a one axis accelerometer, a two axis accelerometer, and a three axis accelerometer.

16. The wireless receiver according to claim 14, wherein the motion detector determines that the wireless receiver is moving based upon acceleration noise reported by the accelerometer.

17. A computer program product comprising computer programming instructions for:
    monitoring, at a receiver, for a transmission from a plurality of stations, wherein the monitoring is performed at a series of time points defined by a first time schedule in order to determine one station in the plurality of stations with which to communicate;
    determining, independently of the monitoring, if the receiver is not moving; and
    continuing the monitoring by adjusting, in response to a determination that the receiver is not moving, the series of time points according to a second time schedule, wherein the series of time points defined by the second time schedule comprises time points that are separated by longer time intervals than the series of time points defined by the first time schedule.

* * * * *